(12) United States Patent
Blake et al.

(10) Patent No.: US 6,839,463 B1
(45) Date of Patent: Jan. 4, 2005

(54) SYSTEM AND METHOD PROVIDING SUBPIXEL-EDGE-OFFSET-BASED DETERMINATION OF OPACITY

(75) Inventors: Andrew Blake, Stapleford (GB); Kentaro Toyama, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 577 days.

(21) Appl. No.: 09/748,562

(22) Filed: Dec. 22, 2000

(51) Int. Cl.[7] .................................................. G06K 9/34

(52) U.S. Cl. .................. 382/173; 382/164; 382/284; 345/614

(58) Field of Search .................................. 382/173–180, 382/162–167, 284, 298–300; 345/611–616; 348/584–592

(56) References Cited

U.S. PATENT DOCUMENTS

| | | | | |
|---|---|---|---|---|
| 5,142,592 A | * | 8/1992 | Moler | 382/203 |
| 5,630,037 A | * | 5/1997 | Schindler | 348/592 |
| 5,701,365 A | * | 12/1997 | Harrington et al. | 382/299 |
| 5,737,455 A | * | 4/1998 | Harrington et al. | 382/284 |
| 5,990,903 A | * | 11/1999 | Donovan | 345/589 |
| 6,128,046 A | * | 10/2000 | Totsuka et al. | 348/590 |
| 6,134,346 A | * | 10/2000 | Berman et al. | 382/163 |
| 6,301,382 B1 | * | 10/2001 | Smith et al. | 382/284 |
| 6,317,525 B1 | * | 11/2001 | Aleksic et al. | 345/611 |
| 6,377,273 B1 | * | 4/2002 | Lee et al. | 345/611 |
| 6,384,839 B1 | * | 5/2002 | Paul | 345/613 |
| 6,525,741 B1 | * | 2/2003 | Klassen et al. | 345/589 |

OTHER PUBLICATIONS

S. Ghosal, et al., *Edge Detection Using Orthogonal Moment–Based Operators*, 11[th IAPR International Conference] on Pattern Recognition, Aug. 30–Sep. 3, 1992, pp. 413–416.

Yu Xiaohan, *A New Algorithm for Texture Segmentation Based on Edge Detection*, Pattern Recognition, vol. 24 No. 11, p. 1105–1112.

S.S. Iyengar, *An Efficient Edge Detection Algorithm Using Relaxation Labeling Technique*, Pattern Recognition, vol. 28, No. 4, p. 519–536.

S. Ghosal, et al., *Orthogonal Moment Operators for Subpixel Edge Detection*, Pattern Recognition, vol. 26, No. 2, p. 295–306.

V. Ultre, et al., *Multispectral Edge Detection by Relaxation Algorithm*, Proceedings of the SPIE—The International Society for Optical Engineering, vol. 2666, p. 252–258.

(List continued on next page.)

*Primary Examiner*—Jingge Wu
(74) *Attorney, Agent, or Firm*—Amin & Turocy, LLP

(57) ABSTRACT

A system is provided for selecting a foreground region of an image, given a set of pixels defining the boundary of the foreground region of the image. The system includes a component to determine a foreground value (F) and opacity value (a) for each pixel on the set wherein a is determined via a subpixel edge-offset to facilitate a separation the foreground region from background portions of the image. The foreground value (F) and opacity value (a) are then employed to smoothly mix the foreground region of the image with a subsequent image background region.

14 Claims, 9 Drawing Sheets

OTHER PUBLICATIONS

Smith, A.R. and Blinn, J.F.; *Blue Screen Matting*, Proceedings of SIGGRAPH 96, Computer Graphics Proceedings, Annual Conference Series, pp. 259–268 (Aug. 1996, New Orleans, Louisiana). Addison Wesley. Edited by Holly Rushmeier. ISBN 0-201-94800-1.

Mitsunaga, T. and Yokoyama, T. and Totsuka, T.; *AutoKey: Human Assisted Key Extraction*, Proceedings of SIGGRAPH '95, Computer Graphics Proceedings, Annual Conference Series, pp. 265–272 (Aug. 1995, Los Angeles, California). Addison Wesley. Edited by Robert Cook. ISBN 0-201-84776-0.

Avrahami, G. and Vaughan, P.; *Sub–Pixel Edge Detection in Character Digilization*, Proceedings RIDT II, R. Morris and J. Audre Eds, CUP 1991, Raster Imaging & Digitial Typogrpahy, pp. 54–64.

Mortensen, E. and Barrett, W.; *Intelligent Scissors for Image Composition*, Computer Graphics Proceedings, Annual Conference Series, 1995, pp. 191–198.

Toyama, K.; *Contours for Cutting, Tracking, and Rotoscoping*, Vision Technology Group: Machine Learning & Perception (74 pages).

* cited by examiner

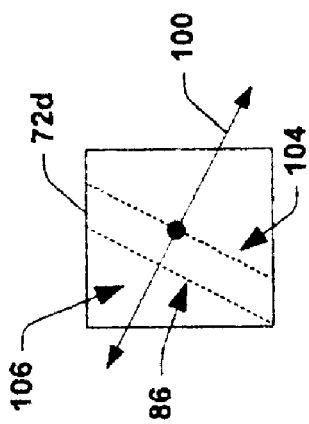
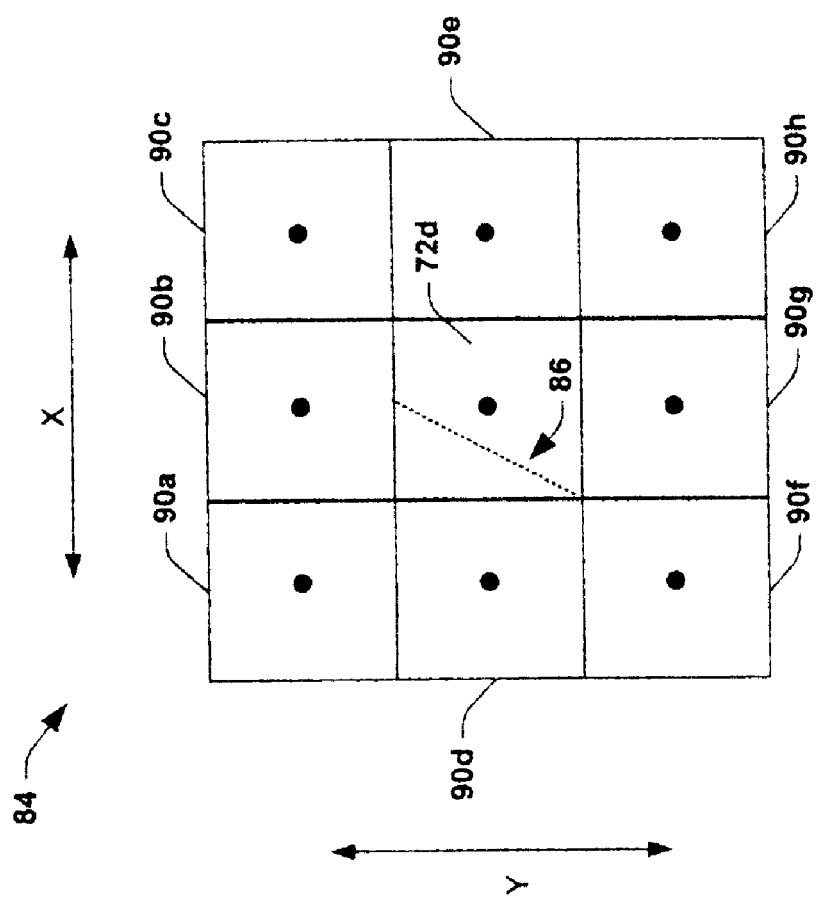

SYSTEM AND METHOD PROVIDING SUBPIXEL-EDGE-OFFSET-BASED DETERMINATION OF OPACITY

TECHNICAL FIELD

The present invention relates generally to computer systems, and more particularly to a system and method to enable smooth mixing and integration of a selected foreground image with an unassociated background image by determining subpixel image areas along a contour of the foreground image.

BACKGROUND OF THE INVENTION

Digital images and related image processing have created a profound impact in all aspects of modern society. From blockbuster movies to the classroom, from business presentations to the daily weather report, digital images affect and influence people—dozens, perhaps, hundreds of times per day. For example, with the advent of communications technologies such as the internet, business persons, students, researchers and ordinary citizens routinely transmit and receive digital images in the normal course of daily activity. Thus, since digital images have become a staple in modern society, ever changing and more sophisticated requirements for image processing are consistently challenging systems designers and architects.

One such challenge relating to image processing is associated with seamlessly combining portions of a first image with portions of a second image. For example, when observing the nightly weather report, the image of the weather person is often interposed with a plurality of background screens depicting various weather patterns. In the case of high-tech movie special effects and/or other computer generated images, an object, person and/or scene portion, known as the foreground, is often digitally extracted from an associated background scene and placed into a second scene having entirely different backgrounds from the first scene. In order to accomplish this type of image extraction and migration however, it is important that remnants or artifacts of the first scene do not appear in the second scene, and that the extracted object, person or scene portion seamlessly migrate into the second scene. In other words, the migrated foreground image should appear without rough edges and appear as though the new background scene was the original background. Unfortunately, conventional image processing systems many times do not effectively achieve these goals.

One such conventional model for extracting foreground image regions from an associated background region relates to utilizing an artificial/engineered and/or clean background (e.g., blue screen), and extracting the foreground image from the artificial background via a background subtraction technique. This may be achieved by processing image pixels and determining whether a threshold level has been attained after subtracting known background pixel values from each pixel value in the image. For example, according to the conventional model, given the known background pixel values of the artificial background, the known background pixel value is subtracted from each pixel in the image and compared to a predetermined threshold. If the result of the subtraction is below the predetermined threshold, the pixel is assumed to be a background pixel and thus not assigned a value in the extracted image. If the result is above the predetermined threshold, the pixel is assumed to be a foreground pixel and thus retains its original value. Unfortunately, background subtraction and other extraction techniques may not cleanly separate foreground regions of the image and enable smooth placement of the foreground onto a new background. Some of the problems associated with these techniques relate to "bluescreen" reflections in the extracted foreground, potential "holes" in the foreground, wherein the values of the foreground and background are mixed, jagged edges along the contours of the extracted image, and "bleeding" of the previous background into the new background. Moreover, providing artificial clean backgrounds is often not possible and/or difficult to achieve.

In view of the above problems associated with conventional image processing systems, there is a need for a system and/or methodology to facilitate precise extraction of a foreground region of an image from an associated background region, and to enable smooth migration of the foreground region to other background regions.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology for enabling portions of image regions to be extracted from adjacent background regions via a sub-pixel edge offset determination at the contours of the extracted image region. In this manner, blurring effects and unwanted background portions are mitigated in the extracted image region. Generally, an image pixel represents a non-zero area on an imaging plane wherein pixels on a region contour tend to straddle both a foreground and a background. Thus, a contour pixel is generally a mixture of both a foreground color and a background color. This mixture may be modeled linearly as follows: $I=\alpha F+(1-\alpha)B$, wherein I represents the actual pixel value, F is the foreground color, B is the background color, and $\alpha$ is the alpha value which represents a mixing ratio of foreground and background colors. Since the I value is known from a given image, $\alpha$, F and B are to be determined.

More particularly, the present invention may determine F as follows: the foreground value may be selected as the color (or intensity value) that a pixel may assume had the pixel been entirely occupied by an extracted and/or cut-out object. Because of image smoothness, it may be expected that a nearby pixel from the foreground side of a contour may have a similar value. Thus, according to one aspect of the invention, an F value for a given contour pixel may be borrowed from the nearest foreground pixel. It is to be appreciated that there are many other possibilities for determining the F value, as will be described in more detail below.

The $\alpha$ value may be determined by computing a local edge orientation and sub-pixel edge-offset associated with the contour of the extracted image. This may be achieved by computing image gradients and edge locations relating to the geometry, direction, and intensity of the contour. For example, sub-pixel offsets may be determined by computing an intensity gradient and intensity gradient magnitude for each contour pixel and associated pixel neighborhood. The intensity gradient enables computation of the orientation of the edge of a contour pixel, if an edge exists. Intensity gradient magnitudes are then sampled in a direction perpendicular to the edge orientation. An optional anisotropic smoothing may also be applied in the direction parallel to the edge orientation. A curve fit is then applied to the intensity gradient magnitude to determine a peak intensity gradient value wherein the edge's degree of offset from the center of the contour pixel may then be determined. The fraction of the pixel that overlaps the foreground side of the line drawn with computed orientation and offset is therefore α. Thus, improved image extraction from a background region may be achieved over conventional systems. It is to be appreciated that a background color B may be similarly selected as described above for F when determining alpha. Alpha is then determined as 1 minus the fraction of the pixel that overlaps the background side of the line drawn with computed orientation and offset.

In accordance with one aspect of the present invention, a system for selecting a foreground region of an image, given a set of pixels defining the boundary of the foreground region of the image, is provided. The system includes a component to determine a foreground value (F) and opacity value (a) for each pixel on the set wherein a is determined via a subpixel edge-offset to facilitate a separation the foreground region from background portions of the image and combining the foreground region with background portions from a new image.

According to another aspect of the present invention, a method for integrating extracted images is provided. The method includes: selecting a set of contour pixels defining a foreground region of an image; determining a subpixel edge offset from the center of each contour pixel; and determining an area of a portion of each contour pixel utilizing the subpixel edge offset to determine an opacity value (a) for each contour pixel.

According to yet another aspect of the present invention, a system for integrating extracted images is provided. The system includes: means for selecting a set of contour pixels defining a foreground region of an image; means for determining a subpixel edge offset from the center of each contour pixel; and means for determining an area of a portion of each contour pixel utilizing the subpixel edge offset to determine an opacity value (a) for each contour pixel.

In accordance with another aspect of the present invention, a signal is employed that facilitates integration of extracted images. The signal communicates information associated with an image. A first component is provided for selecting a set of contour pixels defining a foreground region of the image via the signal, wherein the component determines a subpixel edge offset from the center of each contour pixel, and determines an area of a portion of each contour pixel utilizing the subpixel edge offset to determine an opacity value (a) for each contour pixel. A second component utilizes the opacity value (a) via the signal to smoothly mix the foreground region of the image with a subsequent background region associated with another image. The signal may be communicated over at least one of a network system, such as the Internet, and/or a wireless system.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

BRIEF DESCRIPTION OF THE DRAWINGS

FIG. 3 is a diagram illustrating a contour edge orientation within an image in accordance with an aspect of the present invention;

FIG. 4 is a diagram illustrating a resultant vector of a contour edge orientation determination in accordance with an aspect of the present invention;

DETAILED DESCRIPTION OF THE INVENTION

Figure 1:
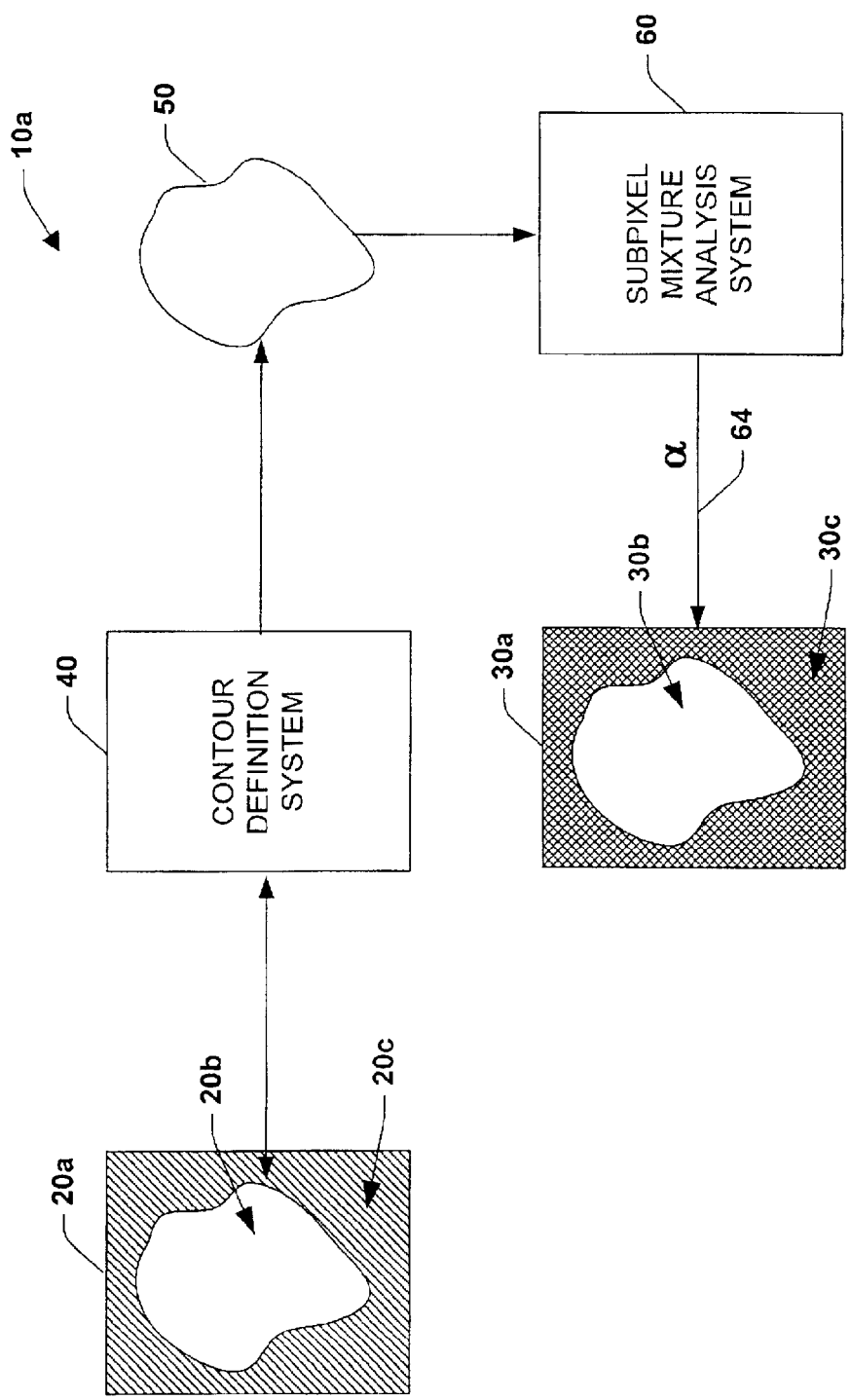
FIG. 1 is a schematic block diagram illustrating an image processing system in accordance with an aspect of the present invention.

The present invention is now described with reference to the drawings, wherein like reference numerals are used to refer to like elements throughout.

The present invention relates to a system and methodology to facilitate removal of a foreground region of an image from an associated background region and to enable smooth mixing of the foreground region with a second and/or subsequent background region. This may be achieved by selecting a chain and/or grouping of pixels defining a contour of the foreground region that is to be extracted from the background region, and determining a subpixel area for the foreground or background portions of the contour pixels, respectively. The chain of pixels defining the foreground region of the image generally includes a mixture of both desired foreground colors and background colors that are to be removed. A mixing ratio known as alpha which defines the mixing ratio of foreground colors and background colors may be determined by computing the area of either the foreground region or the background region within a contour pixel. Subpixel edge offsets may be utilized along the chain of pixels to determine the proportion of area occupied by both the foreground and background colors of the contour pixels. Upon determining alpha, the extracted foreground image may be mixed with a subsequent background image wherein the pixel edges of the extracted image are mixed with the new background image according to the mixing ratio defined by alpha. Thus, smooth mixing of the extracted foreground with the subsequent background is achieved by determining alpha in accordance with the present invention.

Referring initially to FIG. 1, a system 10a illustrates an image processing system in accordance with an aspect of the present invention. An image 20a having both a foreground region 20b and a background region 20c is processed in accordance with the present invention, wherein the foreground region 20b is extracted from the image 20a and transferred to a second and/or subsequent image 30a, having a different background region 30c. A contour definition system 40 is employed to define a chain or grouping of contour pixels 50 which are associated with the exterior of the foreground region 20b. The contour definition system 40 may be substantially any well-known system for selecting the contour pixels 50 of the foreground region 20b. These systems may include for example, "Intelligent Scissors" (as described in (Mortensen, E.N. and Barrett, W.A., "Intelligent scissors for image composition" SIGGRAPH 95 Proceedings, 1995) as well as other suitable systems that provide foreground pixel contour definitions/selections. These systems enable a user and/or system to select/define the exterior of the foreground region 20b (e.g., mouse selection, area defined by an overlaid object on the image) and output the chain or grouping of contour pixels 50 associated with the selection/definition of the foreground region.

Upon selecting the contour pixels 50 of the image 20a, a subpixel mixture analysis system 60 is employed to determine a mixing ratio alpha 64 to enable smooth mixing of the foreground region 20b with the background region 30c. By determining alpha 64, the amount of foreground color attributed to the contour pixels 50 may be determined. Additionally, the mixing ratio alpha 64 enables smooth mixing of the background region 30c with the contour pixels 50 by enabling substantially the same proportion of the background region 30c to be mixed as was the proportion of the background region 20c. As will be described in more detail below, alpha may be determined by the local edge orientation and subpixel offset of the contour pixels 50. Upon determining the edge orientation, a subpixel edge offset may be computed wherein the area defined by the foreground or background colors that reside within a contour pixel may be utilized to determine alpha.

Figure 2:
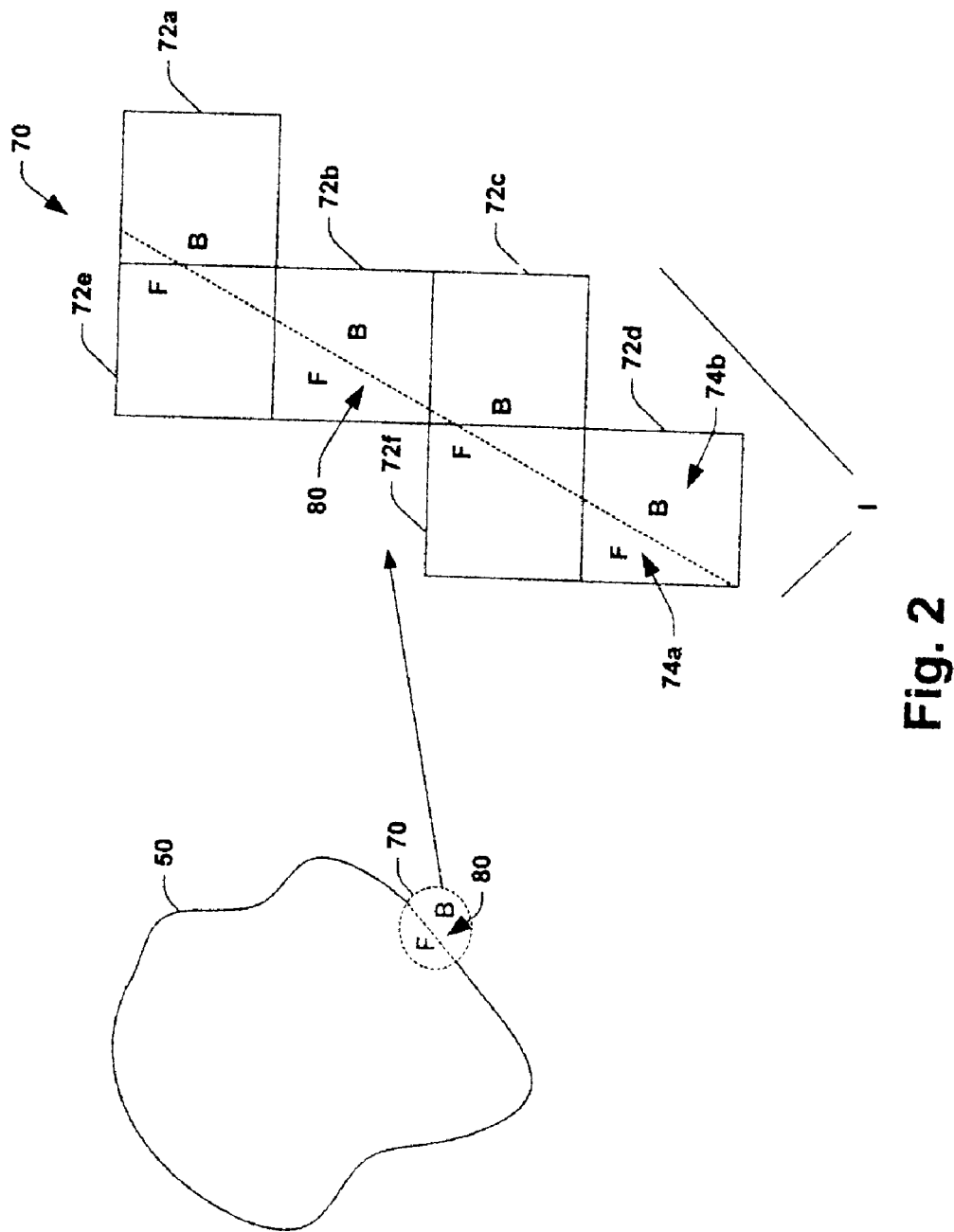
FIG. 2 is a diagram illustrating a contour edge within a subset of contour pixels in accordance with an aspect of the present invention.

Turning now to FIG. 2, a subset 70, of the contour pixels 50, having an associated contour edge 80 are illustrated in accordance with an aspect of the present invention. It is to be appreciated that the contour pixels 50 may include a plurality of pixels, wherein each pixel along the contour is processed as described below. For example, the subset of contour pixels 70 depicts six exemplary contour pixels 72a–72f. As illustrated, a portion of the contour edge 80 traverses through portions of the pixels 72a–72f, wherein the pixels may straddle both the foreground and background regions of the image 20a as depicted in FIG. 1. The foreground regions associated with the contour edge 80 are depicted by the letter (F), whereas the background regions are depicted by the letter (B). Since both the background and foreground colors are mixed within the pixels 72a–72f, the image pixel value (e.g., intensity value) is described by the mixed value and is denoted by the letter (I).

The mixture may be modeled linearly as follows: $I=\alpha F+(1-\alpha)B$, wherein I represents the actual pixel value, F is the foreground color, B is the background color, and a is the alpha value which represents the mixing ratio of foreground and background colors. Since the I value is known from a given image (e.g., reading pixel memory locations), $\alpha$ F and B may be determined as described below. The foreground value may be selected as the color (or intensity value) that a pixel may assume had the pixel been entirely occupied by the extracted and/or cut-out object (e.g., area inside the contour 50 as depicted in FIG. 1). Because of image smoothness, it may be expected that a nearby pixel from the foreground side of the contour pixels 50 (e.g., region within the contour) may have a similar value. Thus, according to one aspect of the invention, the F value for a given contour pixel may be borrowed from the nearest foreground pixel. It is to be appreciated that there are many other possibilities for determining the F value. For example, F values maybe determined via (1) an average of several nearby foreground pixels, (2) a stochastically selected, weighted average of nearby pixels, (3) a pixel generated by a texture reconstruction process applied to nearby foreground pixels, as well as (4) a mixture of the I value and the pixel value generated by any of (1–3)) above.

Alpha is then determined by computing the area occupied by F within each contour pixel 72a–72f, which is described in more detail below. For example, the ratio of the area 74a occupied by the foreground F in the pixel 72d divided by the combined area of the pixel 72d yields the mixing ratio alpha. Since the area of the pixel 72d may be normalized to one, alpha may be determined as the area occupied by F. It is to be appreciated that similar determinations may occur for the background regions B, wherein background colors are selected for B as described above for selecting colors associated with F. Alpha is then determined as 1 minus the fraction of the pixel that overlaps the background side of the line drawn with computed orientation and offset and F is determined by substitution of I, $\alpha$, B into the linear model $I=\alpha F+(1-\alpha)B$. As will be described in more detail below, subpixel edge orientations are determined for the contour pixels 50 which enable a contour edge offset to be computed such as for the areas 74a and/or 74b to yield a value for alpha.

Referring now to FIG. 3, an exemplary subpixel edge orientation determination is illustrated in accordance with an aspect of the present invention. An image 84 is depicted having the pixel 72d with a contour edge portion 86 adjacent to nearby neighboring pixels 90a–90h, wherein a dark region within each pixel represents the intensity value of the pixel at the center of the pixel. It is to be appreciated that more or less pixels may be employed in determining the edge orientation and subsequent edge offset in accordance with the present invention. It is further to be appreciated that the following description for determining subpixel edge orientations and offsets are but one of many well-known image processing techniques for determining the contour edge orientation within a pixel and associated edge offset within a pixel, if any. It is noted that before image processing is commenced, a Gaussian smoothing function may be applied to the image 84 in order to filter potential pixel-wide noise sources. Gaussian smoothing is performed by convolving the image 84 with a Gaussian operator which is defined below:

Equation 1:

$$g(x, y) = \frac{1}{2\pi\sigma^2} e^{-(x^2+y^2)/2\sigma^2}$$

wherein $\sigma$ is the standard deviation representing the width of a Gaussian distribution. The shape of the distribution and hence the amount of smoothing can be controlled by varying $\sigma$. In order to smooth an image f(x,y), the image may be convolved with g(x,y) to produce a smoothed image s(x,y), wherein s(x,y)=f(x,y)*g(x,y).

The edge orientation (e.g., direction the contour edge portion 86 is in relation to the pixel 72d) may be determined by taking the gradient of the image 84 with respect to the X and Y directions depicted in FIG. 3 from the contour pixel 72d. The gradient computation may be directed at intensity values (I) associated with each pixel 72d, 90a–90h, for example as illustrated in Equation 2 below:

Equation 2:

$$\nabla I(x, y) = \partial I/\partial x \, \hat{i} + \partial I/\partial y \, \hat{j}$$

After determining the gradient of the image 84 from the center of the pixel 72d, a resultant gradient vector 100 as depicted in FIG. 4, defines the orientation of the contour edge portion 86. The gradient vector 100 is perpendicular to the orientation of the contour edge portion 86, since image intensity changes most rapidly in the direction of the edge. Thus, an edge 104 line may be determined through the center of the pixel 72d which is parallel to the actual contour edge portion 86 and perpendicular to the gradient vector 100. As depicted in FIG. 4, the contour edge portion 86 is generally offset from the center of the pixel, thus fruther determinations involve computing the amount of offset required to shift the line 104 to the position of the contour edge portion 86. Upon determining the amount of shift for the line 104, an area 106 may then be determined for the foreground portion of the pixel 72d which defines the mixing ratio alpha.

Figure 5:
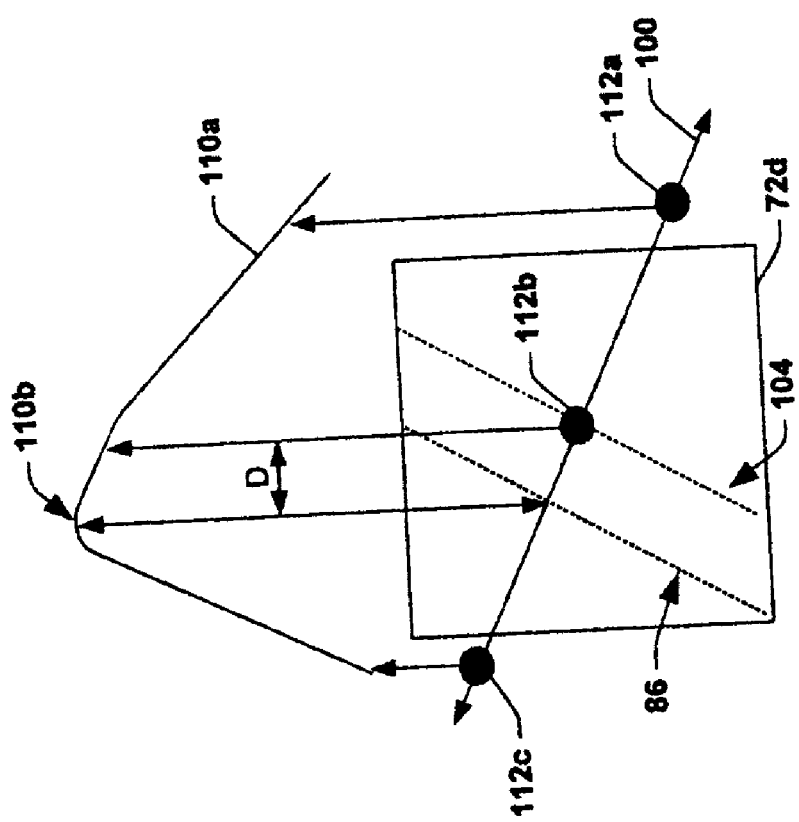
FIG. 5 is a diagram illustrating a contour edge offset determination in accordance with an aspect of the present invention.

Turning now to FIG. 5, one possible edge offset determination is illustrated in accordance with the present invention. Since the edge line 104 that was determined from the gradient vector computation above is through the center of the pixel 72d, a shift determination is performed to determine how far the edge line 104 is from the actual contour edge portion 86. This may be achieved by computing gradient magnitude points along the gradient vector 100 and fitting a curve 110a to the points, for example. By determining how far a peak 110b of the curve 110a is from the center of the pixel 72d, an offset for the line 104 may be computed.

To further illustrate the offset determination, three exemplary gradient magnitude points 112a–112c are illustrated along the gradient vector 100. It is to be appreciated that a plurality of points along the vector 100 may be similarly determined. It is further noted that the gradient magnitude points may be determined at equal pixel distances away (e.g. 1,2,3 pixel distances) and/or at subpixel distance away (e.g., ⅓, ½, ⅔ pixel distances) from the center of the pixel 72d. The gradient magnitude points 112a–112c may be computed from the following Equation:

Equation 3:

$$|\nabla I(x, y)| = \sqrt{(\partial I/\partial x)^2 + (\partial I/\partial y)^2}$$

Figure 6:
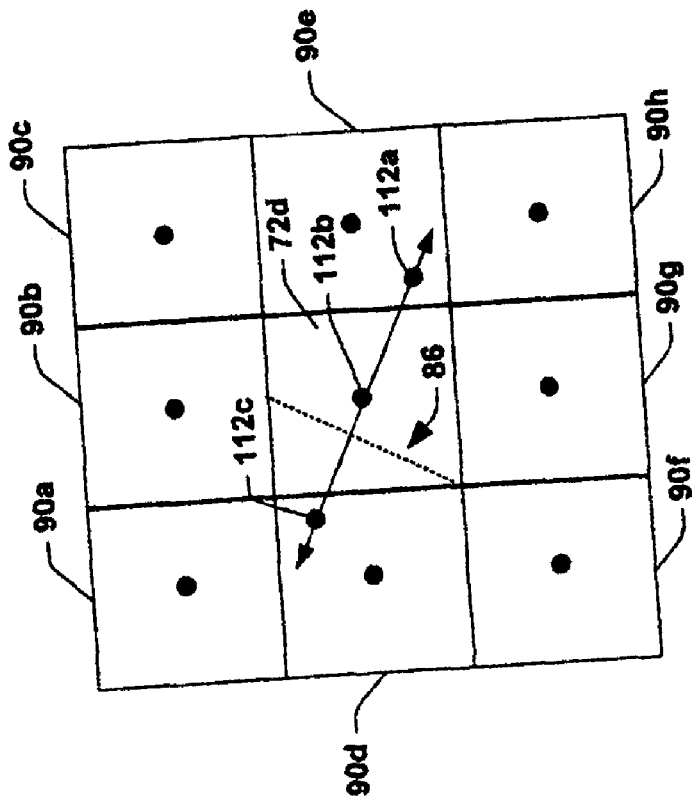
FIG. 6 is a diagram illustrating an interpolation in accordance with an aspect of the present invention.

It is also noted that gradient magnitude points along the gradient vector 100 generally do not fall at the center of adjacent/neighboring pixel locations. Thus, some form of interpolation is generally performed in order to determine a gradient magnitude value that is offset from the center of a pixel. For example, referring briefly to FIG. 6, one possible interpolation process is illustrated. As illustrated, the gradient magnitude points 112a and 112c do not fall at the center points of neighboring pixels 90d and 90e, respectively. Thus, bilinear interpolation may be performed wherein the center pixel values from pixels 90a, 90b, 90d and 72d are employed to compute the gradient magnitude at point 112c. Similarly, the center pixel values from pixels 90b, 90c, 90e and 72d are employed to compute the gradient magnitude at point 112a. It is to be appreciated that other well-known interpolation processes may be employed to determine intermediate gradient magnitude values along the vector 100. For example, bi-cubic interpolation may be employed wherein the values from 16 neighboring pixels are utilized to determine off-center gradient magnitude values.

Referring back to FIG. 5, upon determining the gradient magnitude points 112a–112c, the curve 110a is fit to the gradient magnitude points. For example, a quadratic curve may be fit to the points 112a–112c. It is to be appreciated that substantially any curve fitting technique may be employed to fit the curve 110a such as a higher order polynomial and/or regression technique. After the curve 110a has been fit to the gradient magnitude points, the peak 110b of the curve 110a generally is aligned with the intersection of the subpixel contour edge portion 86 and the gradient vector 100. The edge line 104 which is through the center of the pixel 72d is then offset by an amount "D" along the curve 110a to the contour edge portion 86. As will be described in more detail below in relation to FIG. 8, upon determining the edge offset, an area computation may be performed to determine the mixing ratio alpha.

Figure 7:
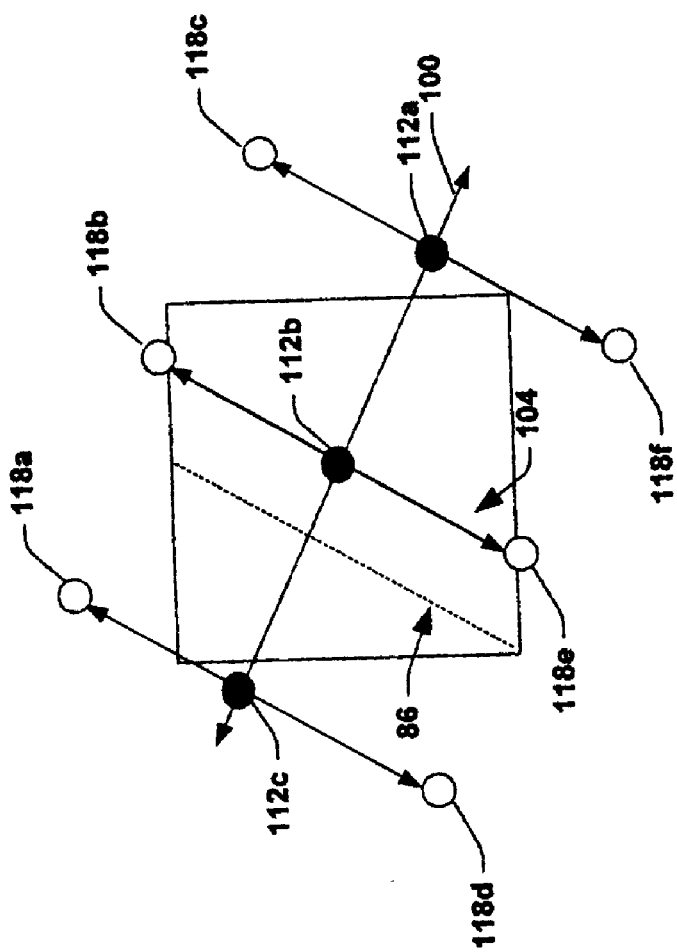
FIG. 7 is a diagram illustrating an isotropic smoothing within an image in accordance with an aspect of the present invention.

Referring briefly to FIG. 7, an optional anisotropic smoothing may be applied to the image along the vector 104 during the gradient magnitude determinations described above. This step involves taking a plurality of image samples 118a–118f, for example, along the gradient vector 100 and parallel to the direction of the edge. For example, samples 118a and 118d are parallel to samples 118b and 118e, which are parallel to the contour edge portion 86. It is to be appreciated that other samples may similarly be determined. Anisotropic smoothing, which is well understood, involves averaging gradient magnitude values that are in line with the parallel samples. The averaging may also be weighted by a Gaussian function, wherein the center values 112a, 112b, and 112c are emphasized over other neighboring values.

Figure 8:
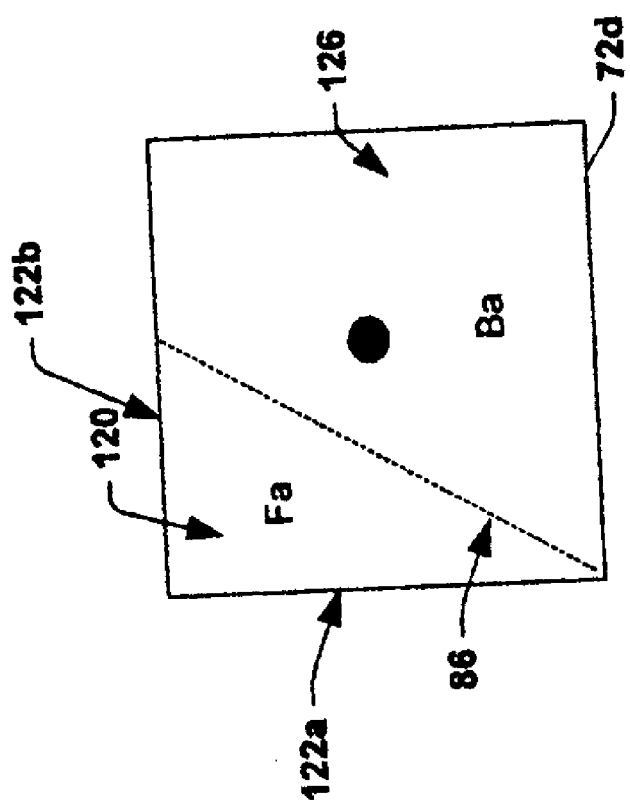
FIG. 8 is a diagram illustrating a subpixel area determination in accordance with an aspect of the present invention.

Refering now to FIG. 8, a subpixel area determination is illustrated for determiring the mixing ratio alpha in accordance with the present invention. After determining the edge offset as described above, a foreground area portion Fa 120 may be defined for the portion of the foreground that is mixed at the subpixel level within the pixel 72d. The foreground area portion 120 is defined by the contour edge portion 86 determined above, and sides 122a and 122b that are intersected by the contour edge portion 86. The foreground area 120 may thus be determined by integrating the function defined by the contour edge portion 86 over the region encompassed by the sides 122a and 122b of the pixel 72d. The mixing ratio alpha is then the ratio of the computed area 120 divided by the entire area of the pixel 72d. Since the area of the pixel may be normalized to unity, the area 120 is thus alpha As described above, a background area portion Ba 126 may be similarly computed as the foreground portion 120. In this case however, alpha would then determined as 1 minus the fraction of the pixel that overlaps the background side of the line drawn with computed orientation and offset.

Figure 9:
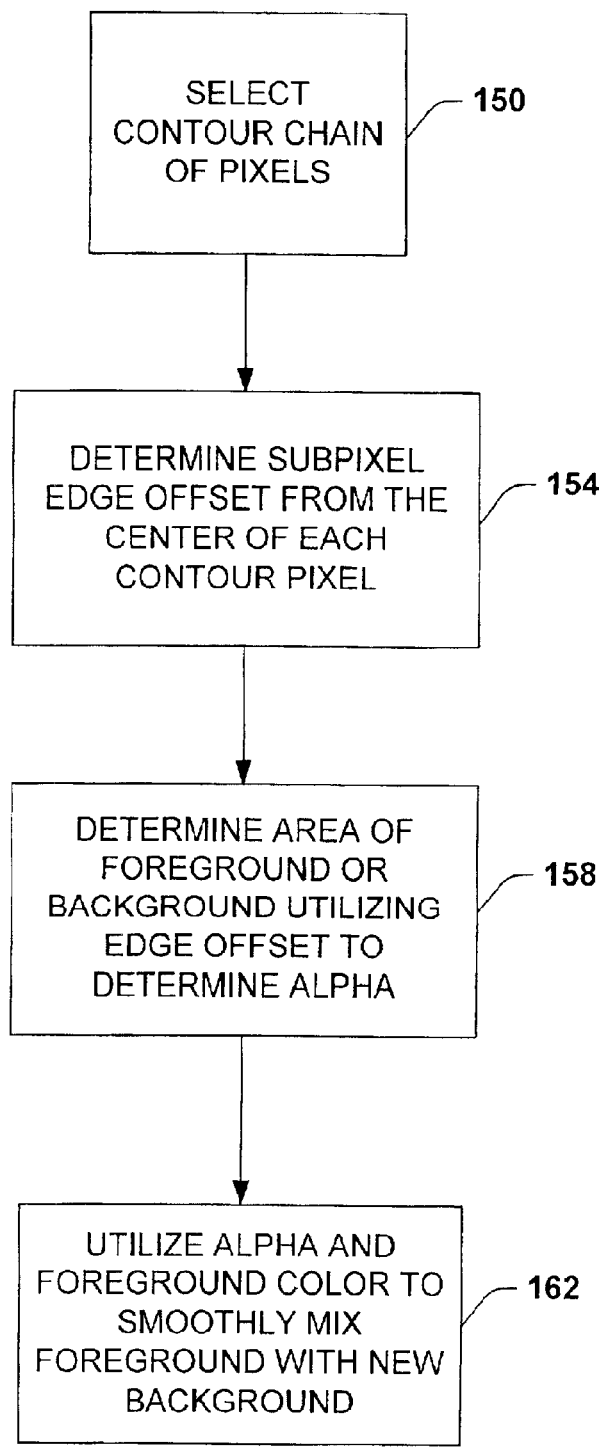
FIG. 9 is a flow chart diagram illustrating a methodology for enabling image extraction and smooth mixing with a new background in accordance with an aspect of the present invention.

FIG. 9 illustrates a methodology for providing smooth image mixing in accordance with an aspect of the present invention. While, for purposes of simplicity of explanation, the methodology is shown and described as a series of blocks, it is to be understood and appreciated that the present invention is not limited by the order of blocks, as some blocks may, in accordance with the present invention, occur in different orders and/or concurrently with other blocks from that shown and described herein. For example, those skilled in the art will understand and appreciate that a methodology could alternatively be represented as a series of interrelated states, such as in a state diagram. Moreover, not all illustrated blocks may be required to implement a methodology in accordance with an aspect of the present invention.

Referring to FIG. 9, and proceeding to block 150, a set and/or chain of contour pixels is selected, wherein the perimeter of the foreground region within an image is identified as described above. At block 154, a subpixel edge offset determination is performed on each contour pixel selected in block 150. As described above, an edge orientation may first be determined by taking the gradient of the image with respect to each contour pixel. Once the edge orientation has been determined, the edge offset may be determined by determining gradient magnitude values along the image gradient, and then applying a curve to the gradient magnitudes in order to determine the degree of offset the contour edge is from the center of the contour pixel. At block 158, an area is determined for the subpixel area defined by the edge offset determined in block 154 and the sides of the contour pixels. After determining the subpixel area, an alpha value defining the mixing ratio of foreground and background colors may be determined as described above. At block 162, the alpha value is utilized to smoothly mix the selected foreground region of block 150 with a second and/or subsequent background region.

Figure 10:
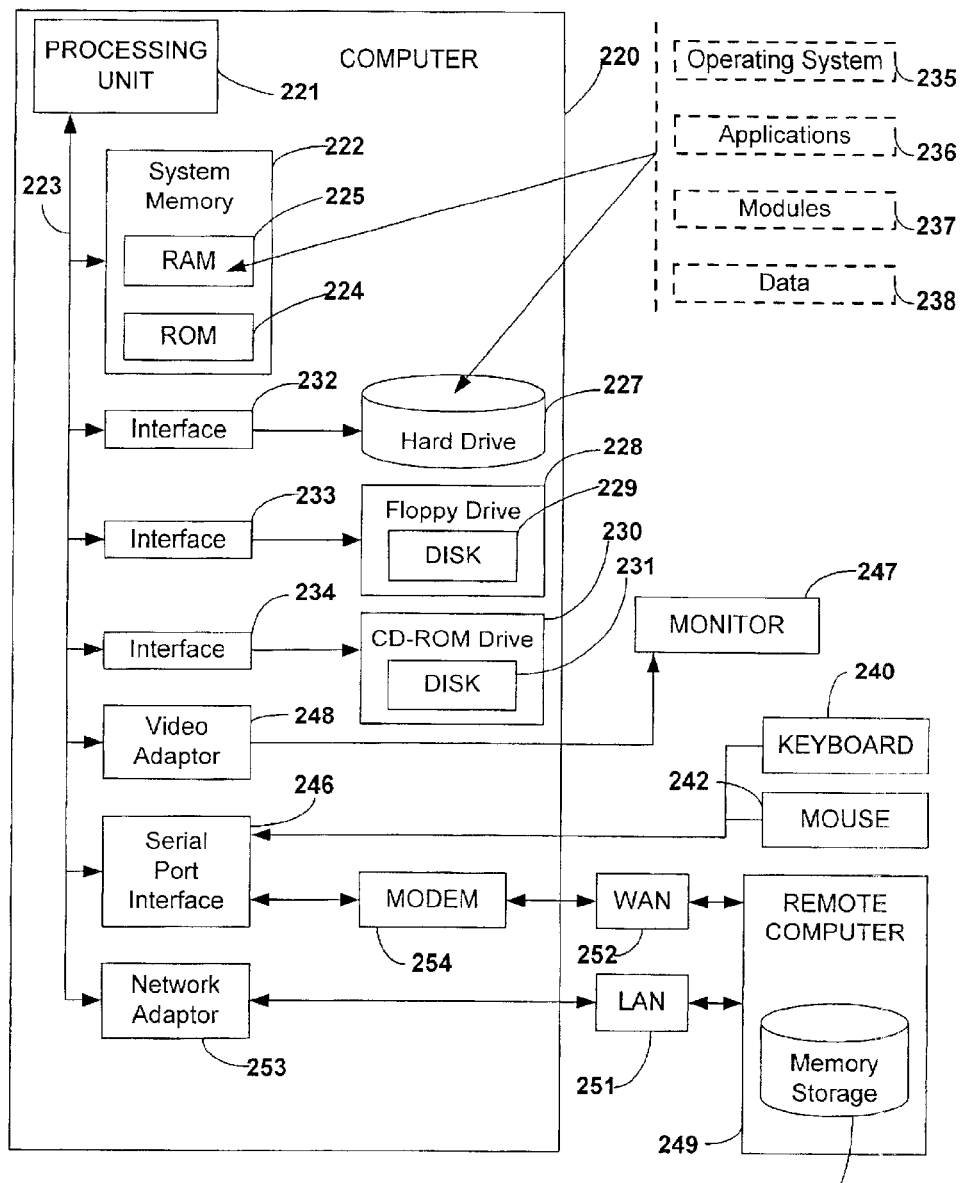
FIG. 10 is a schematic block diagram illustrating a suitable operating environment in accordance with an aspect of the present invention.

In order to provide a context for the various aspects of the invention, FIG. 10 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 10, an exemplary system for implementing the various aspects of the invention includes a conventional computer 220, including a processing unit 221, a system memory 222, and a system bus 223 that couples various system components including the system memory to the processing unit 221. The processing unit 221 may be any of various commercially available processors. It is to be appreciated that dual microprocessors and other multi-processor architectures also may be employed as the processing unit 221.

The system bus may be any of several types of bus structure including a memory bus or memory controller, a peripheral bus, and a local bus using any of a variety of conventional bus architectures. The system memory may include read only memory (ROM) 224 and random access memory (RAM) 225. A basic input/output system (BIOS), containing the basic routines that help to transfer information between elements within the computer 220, such as during start-up, is stored in ROM 224.

The computer 220 further includes a hard disk drive 227, a magnetic disk drive 228, e.g., to read from or write to a removable disk 229, and an optical disk drive 230, e.g., for reading from or writing to a CD-ROM disk 231 or to read from or write to other optical media. The hard disk drive 227, magnetic disk drive 228, and optical disk drive 230 are connected to the system bus 223 by a hard disk drive interface 232, a magnetic disk drive interface 233, and an optical drive interface 234, respectively. The drives and their associated computer-readable media provide nonvolatile storage of data, data structures, computer-executable instructions, etc. for the computer 220. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 225, including an operating system 235, one or more application programs 236, other program modules 237, and program data 238. It is noted that the operating system 235 in the illustrated computer may be substantially any suitable operating system.

A user may enter commands and information into the computer 220 through a keyboard 240 and a pointing device, such as a mouse 242. Other input devices (not shown) may include a microphone, a joystick, a game pad, a satellite dish, a scanner, or the like. These and other input devices are often connected to the processing unit 221 through a serial port interface 246 that is coupled to the system bus, but may be connected by other interfaces, such as a parallel port, a game port or a universal serial bus (USB). A monitor 247 or other type of display device is also connected to the system bus 223 via an interface, such as a video adapter 248. In addition to the monitor, computers typically include other peripheral output devices (not shown), such as speakers and printers. The computer 220 may operate in a networked environment using logical connections to one or more remote computers, such as a remote computer 249. The remote computer 249 may be a workstation, a server computer, a router, a peer device or other common network node, and typically includes many or all of the elements described relative to the computer 220, although only a memory storage device 250 is illustrated in FIG. 10. The logical connections depicted in FIG. 10 may include a local area network (LAN) 251 and a wide area network (WAN) 252. Such networking environments are commonplace in offices, enterprise-wide computer networks, Intranets and the Internet.

When employed in a LAN networking environment, the computer 220 may be connected to the local network 251 through a network interface or adapter 253. When utilized in a WAN networking envirornent, the computer 220 generally may include a modem 254, and/or is connected to a communications server on the LAN, and/or has other means for establishing communications over the wide area network 252, such as the Internet. The modem 254, which may be internal or external, may be connected to the system bus 223 via the serial port interface 246. In a networked environment, program modules depicted relative to the computer 220, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 220, unless otherwise indicated. Such acts and operations are sometimes referred to as being computer-executed. It will be appreciated that the acts and symbolically represented operations include the manipulation by the processing unit 221 of electrical signals representing data bits which causes a resulting transformation or reduction of the electrical signal representation, and the maintenance of data bits at memory locations in the memory system (including the system memory 222, hard drive 227, floppy disks 229, and CD-ROM 231) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A system for selecting a foreground region of an image, given a set of pixels defining the boundary of the foreground region of the image, comprising:

a component to determine a foreground value (F) and an opacity value (α) for each pixel on the set wherein a is determied via a subpixel edge-offset to facilitate a separation of the foreground region from background portions of the image and to combine the foregmund region with background portions from a new image, the component determines an edg orientation via a gradient plied to the image to produce a resultant gradient vector that is perpendicular to the edge orienation, further the component determines gradient magnitudes along the resultant gradient vector in order to determine the subpixel edge offset.

2. The system of claim 1, wherein the foreground value (F) and opacity value (α) are employed to mix the foreground region of the image with a subsequent image background region.

3. The system of clam 1, wherein Intelligeut Scissor are employed to define the foreground region of the image.

4. The system of claim 1, wheran the background portions and foreground regions of the image are mixed within pixels along the foreground region according to the equation $I=\alpha F+(1-\alpha)B$.

5. The systm of claim 4, wherein the component selects colors for each pixel on the set for the background portions or the foreground regions of the image according to borrowing a color value from a neighboring pixel location.

6. The system of claim 4, wherein the component selects colors for each pixel on the set for the background portions or the foreground regions of the image acording to an average of sevy nearby pixels.

7. The system of claim 4, wherein the component selects colors for each pixel on the set for the background portions or the foreground regions of the image according to a stochartically selected, weighted average of nearby pixels.

8. The system of claim 4, wherein the component selects colors for each pixel on the set for the background portions or the foreground regions of the image according to a pixel generated by a texture reconstruction process applied to nearby pixels.

9. The system of claim 4, whcrrin the component selects colors for each pixel on the set for the background portions or the foreground regions of the image according to a mixture of an intensity value and the pixel value generated by at least one of an average of several nearby pixels, a stochastically selected, weighted average of nearby pixels, and a pixel generated by a texture reconstruction process applied to nearby pixels.

10. The system of claim 1, wherein the component employs at least one of bilinear and bi-cubic interpolation in order to determine the gradient magnitudes.

11. The system of claim 1, wherein the component employs anisotropic smoothing in order to determine the gradient magnitudes.

12. The system of claim 1, wherein the component employs Gaussian smoothing to reduce pixel-wide noise associated with the image.

13. The system of claim 1, wherein the component fits a curve to the gradient magnitudes in order to determine the subpixel edge offset.

14. The system of claim 13, wherein the component integrates over the area defined by the subpixel edge offset and at least one side of the pixel in order to determine the opacity value (α).

* * * * *